United States Patent [19]

Nevitt

[11] Patent Number: 4,468,373

[45] Date of Patent: Aug. 28, 1984

[54] PROCESS FOR SOLVENT EXTRACTION OF VANADATE AND MOLYBDATE ANIONS

[75] Inventor: Thomas D. Nevitt, Naperville, Ill.

[73] Assignee: Standard Oil Co (Indiana), Chicago, Ill.

[21] Appl. No.: 405,755

[22] Filed: Aug. 6, 1982

[51] Int. Cl.³ .................. C01G 31/00; C01G 39/00
[52] U.S. Cl. .................................. 423/54; 423/63; 75/101 BE
[58] Field of Search .............. 423/63, 54; 75/101 BE

[56] References Cited

U.S. PATENT DOCUMENTS 3,083,085 3/1963 Lewis et al. .................. 423/63
3,320,024 5/1967 Burwell ........................ 423/63

FOREIGN PATENT DOCUMENTS 811670 4/1969 Canada ........................ 423/63

OTHER PUBLICATIONS

Koloini et al., "Chem. Absts.", vol. 84, 1976, #50398r.

Primary Examiner—Herbert T. Carter
Attorney, Agent, or Firm—Robert E. Sloat; William T. McClain; William H. Magidson

[57] ABSTRACT

A process for recovery of vanadium and molybdenum from a feed material containing compounds of these metals by reacting at an effective pH an aqueous solution of vanadate and molybdate anions with a quaternary ammonium surfactant dissolved in an organic solvent which is immiscible with water and separating a vanadate anion rich phase from a molybdate anion rich phase.

20 Claims, No Drawings

PROCESS FOR SOLVENT EXTRACTION OF VANADATE AND MOLYBDATE ANIONS

BACKGROUND OF THE INVENTION

This invention relates to a process for recovery of vanadium and molybdenum values from a feed material by solvent extraction of both vanadate and molybdate anions, said process comprises contacting under effective pH conditions an aqueous solution comprising molybdate and vanadate anions with a quaternary ammonium surfactant dissolved in an organic solvent immiscible with water and partitioning an extract phase rich in vanadate anions from a raffinate phase rich in molybdate anions. More particularly, this invention relates to a process for recovery of vanadium and molybdenum values from catalytic materials by solvent extraction of both vanadate and molybdate anions in a leachate solution from said catalytic materials, said process comprises contacting under effective pH conditions an aqueous alkaline solution of molybdate and vanadate ions with a trifatty monoalkyl quaternary ammonium salt dissolved in an organic solvent immiscible with water and partitioning an extract phase rich in vanadate anions from a raffinate phase rich in molybdate anions.

The metal vanadium is a strategically important metal for the United States and is not currently produced in the United States in any sizeable quantity. Important applications of vanadium include use as an alloying component in stainless steels and as a hardener in carbon steels and tool steels. Presently there is also a great deal of interest in upgrading petroleum resid feedstocks by hydroprocessing which gives rise to deposition of vanadium and nickel sulfides on hydroprocessing catalysts. For a typical resid feed with 200 ppm vanadium it is estimated that a major refinery processing 100,000 barrels of resid per day will accumulate 6,000 pounds per day of vanadium on the hydroprocessing catalyst. Recovery of this vanadium could provide about 15 percent of the U.S. requirements for vanadium.

Commercial extraction of vanadium and molybdenum from a feed material containing sulfides of both metals has typically been carried out by oxidizing the metal sulfides in the feed material to metal oxides and sulfates, followed by leaching the vanadate and molybdate anions from the material with an alkaline solution, recovering the alkali metal vanadate and molybdate from the alkaline solution, and separating vanadate from molybdate anions by fractional precipitation (see Toida et al., U.S. Pat. No. 4,145,397). This fractional precipitation method requires a lengthy, involved procedure, and large amounts of relatively expensive precipitating agents are necessary to obtain adequate product purity.

Several U.S. patents have disclosed extraction methods for recovery of metals such as molybdenum, rhenium, and vanadium from feed materials; and these extraction processes use extractants comprising quaternary ammonium surfactants and various amine based solutions (see Peterson, U.S. Pat. No. 3,251,555; Mollerstedt and Backius, U.S. Pat. No. 4,000,244; and Pitts, U.S. Pat. No. 4,150,092). However, none of these patents disclose the use of quaternary ammonium surfactants to perform extraction of both molybdate and vanadate anions from an alkaline leachate solution and at the same time carry out the single step separation of molybdate from vanadate anions.

While an extraction process for the recovery of both molybdate and vanadate anions by a quaternary ammonium surfactant solution has been disclosed by Lewis and Drobnick in U.S. Pat. No. 3,083,085, the patentees do not disclose the extraction and separation of molybdate and vanadate from each other. Moreover our studies have shown that the patentees' disclosed "optimum pH" values for extraction of 9.3 to 9.5 results not only in vanadate extraction, but also yields a large amount of molybdate in solution with the vanadate. Accordingly, there is a need for an improved extraction recovery process which will permit efficient extraction of molybdate and vanadate anions from an aqueous solution and will produce at least two separate products streams, each of high purity in vanadate or molybdate anions.

The general object of this invention is to provide an improved process to recover, separately, vanadium and molybdenum values from a feed material by a solvent extraction treatment of a solution containing vanadate and molybdate anions. A more specific object of this invention is to provide an improved process to recover, separately, vanadium and molybdenum values present on petroleum catalytic materials. Other objects of this invention will be apparent to persons skilled in the art from the following description and appended claims.

DESCRIPTION OF THE INVENTION

We have now found that the objects of this invention can be obtained by contacting under effective pH conditions an aqueous solution comprising molybdate and vanadate anions with an extractant comprising a water immiscible organic solution of a quaternary ammonium surfactant, and partitioning a vanadate rich phase from a molybdate rich phase. This process overcomes the disadvantages of Lewis and Drobnick by having the unexpected ability to perform a single step extraction of molybdate and vanadate anions, as well as separate molybdate and vanadate anions from one another.

Briefly this invention comprises a process for the solvent extraction of vanadium and molybdenum values from feed materials, such as petroleum catalysts, which have vanadium sulfides deposited during petroleum resid hydroprocessing operations on catalysts containing Ni-Mo, Co-Mo, and Mo, for example. A preliminary step in the recovery operation is the oxidation of the molybdenum and vanadium to a higher oxidation state by converting sulfides to sulfates and oxides, and removing carbon by forming oxide gases. Typically, this is accomplished by an air atmosphere roasting procedure. After this preliminary thermal oxidation step, the material is subjected to an aqueous alkaline leaching operation which forms an alkaline water leachate solution, preferably containing alkali metal molybdate and akali metal vanadate with other materials and metals, such as nickel and cobalt, not leached into solution. However it is understood that the presence of small concentrations of other materials such as silica, alumina, phosphorous (see Example II), and most metals, does not hinder the extraction process. This leachate solution is then preferably treated with a chemical oxidizer to insure the vanadium and molybdenum values are in their highest oxidation states. The pH of this treated aqueous alkaline solution is then preferably adjusted to a value near neutrality, and the solution is contacted with an extractant containing a quaternary ammonium surfactant dissolved in an organic liquid hydrocarbon or halohydrocarbon solvent, and the resulting extractant is insoluble in water. A common commercially available quaternary ammonium surfactant is Aliquat 336, and was used in the Examples. Aliquat 336 is the trademark of a product sold by Henkel Corp., Dusseldorf, West Germany. Aliquat 336 is a quaternary ammonium surfactant comprising quaternary ammonium cations which have long chain aliphatic groups and at least 50 percent of the long chain aliphatic hydrocarbon groups have $C_8$ chains, and the balance of the long chain aliphatic groups have $C_{10}$ chains.

After adjusting the leachate solution-extractant solution pH to appropriate levels the quaternary ammonium surfactant selectively extracts vanadate anions from a solution containing both molybdate and vanadate anions. The vanadate rich organic liquid phase is then separated from the molybdate rich aqueous phase by virtue of the insolubility of the organic solution in the aqueous phase, and vanadium and molybdenum are subsequently extracted from these two separate streams.

As described above the species of extractant used in the Examples is Aliquat 336 and is one type of quaternary ammonium surfactant. Broadly, Aliquat 336 is a cationic surfactant with a long chain cation group as the hydrophobic group, and the anion is generally chloride or bromide. Cationic surface active agents are generally classed as quaternary ammonium salts or salts of higher alkylamines. The general quaternary ammonium surfactants useful in this invention comprise at least 1 long chain aliphatic, or fatty, group and preferably at least 2 long chain aliphatic groups with 8 to 24 carbon atoms, and the remaining groups are of the alkyl group type with 1 to 4 carbon atoms per group. In some cases benzyl and phenyl groups can be attached to the quaternary ammonium group, and 2 or more quaternary ammonium groups are present in some surfactant compounds.

Typical commercial quaternary ammonium surfactants comprise dialkyldimethylammonium salts, alkylbenzyldimethylammonium chlorides, alkyltrimethylammonium salts, and alkylpyridinium halides. Commercially available dialkyldimethylammonium salts include, for example, Adogen 442 and 462, Ammonyx 2194, Arquad 2C-75 and 2S-75. Commercially available alkylbenzyldimethylammonium chlorides include, for example, Alacasan SAC-25, Ammonyx 856 and 4002, Barquat LB-50, and Hyamine 3500. Commercially available alkyltrimethylammonium salts include, for example, Acetoquat CTAB, Alacsan DBC-50, Ammonyx 23 and 27, Barquat BT-60 and TC-50, and Emicol E-12. Commercially available alkylpyridinium halides include, for example, Acetoquat CPC and CPB, Intexcan CPB and CPC, and Cetyl pyridinium bromide. (See Tables 37 to 40, pp. 562–564, in the description of cationic surfactants in *Encyclopedia of Chemical Technology*, 2d. Ed., edited by R. E. Kirk and D. F. Othmer, Interscience, N.Y., 1954).

A subclass of quaternary ammonium surfactants includes trifatty monoalkyl quaternary ammonium salts and are discussed in Lewis and Drobnick, U.S. Pat. No. 3,083,085, which is incorporated by reference into this specification. The cation portion of said trifatty monoalkyl quaternary ammonium salt comprises nitrogen surrounded by three fatty groups (long chain aliphatic groups) and one alkyl group, and the anion portion is generally any anion grouping, commonly chloride and bromide. The fatty group of the cation comprises 8 to 18 carbon atoms, and the alkyl group comprises 1 to 4 carbon atoms. The three fatty groups do not have to be the same species in order to function effectively as an extractant. The fatty groups are long chain aliphatic hydrocarbons with straight or branched, and saturated or unsaturated chains. Examples of typical trifatty monoalkyl quaternary ammonium salts comprise chlorides and bromides of cationic species such as trioctylbutylammonium, trioctylisopropylammonium, tridecylmethylammonium, tridodecylmethylammonium, tetradecylmethylammonium, hexadecyldioctylmethylammonium, and mixtures thereof.

These quaternary ammonium surfactants are dissolved in an organic solution extractant with the solvent comprising a hydrocarbon or halohydrocarbon liquid. Typical solvents include mixed xylenes, kerosene, heptane, tetralin, fuel oil, or any other hydrocarbon liquid which dissolves the quaternary ammonium surfactant; and the organic solvent and the resulting extractant are immiscible with water. Preferably the organic solvent has a boiling point between 90° and 300° C.

In somewhat greater detail the process comprises combining the extractant solution with the aqueous alkaline leachate solution containing the vanadate and molybdate anions. The pH of the aqueous phase is adjusted to a minimum of 4 and preferably about 7 prior to mixing with the extractant solution. In the Examples several extractant concentrations were used, 10 and 20 percent. After combining the two solutions, the pH tends to become more alkaline and is adjusted to the appropriate lesser pH by addition of acid, or if desired, the pH can be increased by addition of a base. Under appropriate pH conditions the quaternary ammonium surfactant extracts vanadate anions in preference to molybdate anions with the aqueous raffinate phase rich in molybdate anions. This selectivity occurs at a pH of at least 4, preferably at about 7, but not so large that selectivity is lost, which occurs at approximately a pH of 9. The aqueous phase and organic liquid phase are relatively immiscible in one another and therefore undergo physical separation when in contact. This attribute permits partitioning of the organic and aqueous liquids which are rich in vanadate and molybdate anions, respectively. Partitioning could, for example, occur by use of a centrifuge method or by simple layering and withdrawal methods.

The use of the quaternary ammonium surfactant in a commercial process for extraction of vanadium and molybdenum from a feed material comprises the following: (1) aqueous alkaline leachate solution containing sodium molybdate and sodium vanadate are mixed with a chemical oxidizer to insure vanadate and molybdate are in their highest oxidation states; (2) the pH of this alkaline solution is changed to a preferable pH of about 7, typically by addition of an acid, such as sulfuric acid; (3) this solution is filtered to remove insoluble impurities, such as gelatenous alumina; (4) the filtered solution is subjected to extraction treatment with a quaternary ammonium surfactant in an organic solvent such as xylene, and a first stream is produced which is rich in vanadium in the form of $R_4NVO_3$ in the organic solution (where R is one of the long chain aliphatic groups or is an alkyl group); (5) after the extraction treatment, sodium sulfate solution is added to the first stream of $R_4NVO_3$ solution and the quaternary ammonium surfactant, such as $R_4SO_4$, is regenerated and an aqueous solution of purified sodium vanadate is also produced; (6) a second stream is also produced during the extraction treatment step and is an aqueous stream of sodium molybdate in solution; (7) the molybdate rich stream is adjusted to a pH of about 5 and is subjected to treatment with the quaternary ammonium extractant solution to yield one product stream of $(R_4N)_2MoO_3$ in xylene and another stream consisting of a sodium sulfate solution, and (8) a sodium sulfate solution is added to the molybdate extract to produce a purified sodium molybdate in aqueous solution. This process has broader applications than just extraction from alkali leachate solution obtained from deactivated catalytic material used for resid hydrocarbon processing. Many mining and metallurgical procedures produce suitable aqueous solutions containing vanadate and molybdate anions which can be processed as just discussed.

EXAMPLE 1

The effectiveness of molybdate and vanadate anion extraction and also separation of molybdate and vanadate anions from one another is strongly dependent on the pH of the mixture of the quaternary ammonium surfactant solution and the aqueous alkaline leachate solution containing molybdate and vanadate anions. As shown in Table I, the maximum effectiveness and discrimination between vanadate and molybdate anions occurs at a pH of approximately 5, that is the ratio of vanadate to molybdate anions which have been removed decreases either side of a pH of about 5. However, the maximum difference between the quantitative amounts of vanadate and molybdate anions removed occurs at a pH of about 7. As the pH increases to 9 and 11, the total quantity of vanadate plus molybdate anions also increases, but at the expense of decreased discrimination between molybdate and vanadate anions.

TABLE I

EXTRACTION OF AQUEOUS VANADATE AND MOLYBDATE ANIONS WITH 20% ALIQUAT 336 IN XYLENE

| Feed: | 45 ml of 1 g $NaVO_3$, 4 g $Na_2MoO_4$ |
|---|---|
| Extractant: | 20% Aliquat 336 in xylene |
| Temperature: | Ambient, about 73° F. |

| | Grams in Raffinate | |
|---|---|---|
| pH | $NaVO_3$ | $Na_2MoO_4 \cdot 2H_2O$ |
| 3 | 0.001 | 0.02 |
| 5 | <0.0001 | 0.32 |
| 7 | 0.01 | 3.5 |
| 9 | 0.33 | 3.5 |
| 11 | 0.9 | 3.2 |

EXAMPLE II

The effectiveness of metal removal also is highly sensitive to the moles of vanadate anions in solution but is relatively insensitive to the moles of molybdate anion. In Table II is shown the concentration of anions and also the percentage effectiveness of removal for each concentration. The effectiveness of vanadate anion removal exhibits a threshold type behavior as a function of the moles of vanadate in the aqueous solution-extractant mixture. Approximately 63% of the vanadate anions are extracted if the vanadate concentration is about 0.004 moles (or 0.5 grams) $NaVO_3$ per 50 milliliters of aqueous carrier solution and 0.05 moles (or 20 grams) of Aliquat 336 in 100 milliliters of xylene. At larger concentrations of vanadate anions, for example 0.02 moles (2.5 grams of $NaVO_3$ per 50 milliliters of aqueous solution), the vanadate anion extraction rapidly improved to 95%. As the moles of vanadate anions and Aliquat 336 becomes more balanced, the vanadate anions are effectively removed as opposed to relatively low moles of vanadate anions compared to the quaternary ammonium surfactant, Aliquat 336. Finally, even though the concentration of sodium molybdate in the feed is changed by a factor of about 5, (from 0.45 g. to 2.21 g. moles), the efficiency of molybdate anion removal in the raffinate only changes from 98 to 95%, respectively.

The last entry in Table II shows the effect of phosphorous ions being present in the feed material. Some commercial desulfurization catalysts contain phosphorous which would occur as phosphate ions, and is in solution along with the molybdate and vanadate anions from the alkaline solution leaching of the catalyst. Phosphate complexes form in the presence of molybdates and vanadates; therefore, an extraction was performed to determine whether phosphate ions interfered with extraction of vanadate and molybdate anions. The data in Table II indicate phosphate ions cause no perceptible detrimental effect on extraction efficiency or selectivity.

TABLE II

EFFECT OF METAL CONCENTRATION ON EXTRACTION OF AQUEOUS VANADATE AND MOLYBDATE WITH ALIQUAT 336

Feed: $NaVO_3$ and $Na_2MoO_4$ in 50 ml. of water.
Extractant: 20% Aliquat 336 in xylene (20 g in 100 ml. xylene).

| Feed | | Raffinate | | |
|---|---|---|---|---|
| $NaVO_3$ g | $Na_2MoO_4$ g | $NaVO_3$ g | $Na_2MoO_4$ g | Wt % $Na_2MoO_4$ |
| 0.50 | 0.45 | 0.0003 | 0.16 | 98 |
| 2.49 | 0.44 | 0.02 | 0.36 | 95 |
| 2.58 | 2.21 | 0.11 | 2.02 | 95 |
| 3.44 | 1.94 | 0.10 | 1.84 | 95 |
| 3.44* | 1.95 | 0.08 | 1.85 | 96 |

| Feed | | Extract | | |
|---|---|---|---|---|
| $NaVO_3$ | $Na_2MoO_4$ g. | $NaVO_2$ g. | $Na_2MoO_4$ g. | Wt % $NaVO_3$ |
| 0.50 | 0.45 | 0.50 | 0.29 | 63 |
| 2.49 | 0.44 | 2.47 | 0.08 | 97 |
| 2.58 | 2.21 | 2.47 | 0.19 | 93 |
| 3.44 | 1.94 | 3.35 | 0.10 | 97 |
| 3.44* | 1.95 | 3.35 | 0.11 | 97 |

*Contained 2% $Na_2HPO_4$

EXAMPLE III

The effect of extractant concentration was determined by fixing the concentration of metal anions in the aqueous feed material and varying the amount of quaternary ammonium surfactant (Aliquat 336) in the organic solution. The feed material contains 0.2 moles $NaVO_3$ and 0.02 moles of $Na_2MoO_3$ in 50 milliliters of water. These relative amounts of sodium vanadate and sodium molybdate are anticipated to be representative of metal concentrations found in the product from alkaline leaching of hydroprocessing type catalytic materials coated with metal deposits arising from use in petroleum resid feed processing. Six extractions are shwon in Table III, and the extractant has either 0.025 or 0.05 (20 g. in 100 ml. xylene) moles of the Aliquat 336 diluted in xylene to give extractant volumes of 50, 100, and 200 milliliters. Sufficient vanadate anion concentration was present in the feed material to yield an efficient removal of 96 to 99 percent vanadate anions and only 1 to 4 percent of molybdate anions.

Separation of molybdate and vanadate anions was not generally as complete in the raffinate phase. In the raffinate phase the molybdate anion weight percentage concentration varied from 28 to 97 percent, and the vanadate anion weight percentage concentration ranged from 70 to 2 percent. When 0.05 moles of the Aliquat 336 were used, the vanadate anion concentration recovered was highest when the extractant volume was diluted to 200 milliliters with xylene. The extract phase contained 96 percent of the vanadate, and the raffinate phase contained 97 percent of the molybdate anions. As the xylene volume diminished to 100 milliliters and then to 50 milliliters, a decreasing amount of vanadate anion concentration was extracted; but the ratio of vanadate to molybdate anion concentration removed increased. On the other hand, as the xylene dilution decreased from 200 milliliters to 100 and then to 50 milliliters, the raffinate phase contained larger amounts of unextracted vanadate; thus, the molybdate concentration purity in the raffinate phase was diminished.

When the amount of the quaternary ammonium salt, Aliquat 336, was decreased from 0.05 to 0.025 moles and the metal feed concentrations remained the same, the trends described above were accentuated. Good separation of both molybdate anions in the raffinate phase and vanadate anions in the extract phase were obtained at the greatest dilution of Aliquat 336 with xylene. Therefore, as the amount of xylene solvent is decreased the separation of molybdate from vanadate anions in the extract is more selective, but a lower total amount of vanadate anions is extracted. Consequently, the raffinate phase contains large quantities of vanadate anions along with molybdate anions.

TABLE III

EFFECT OF EXTRACTANT COMPOSITION ON EXTRACTION OF AQUEOUS VANADATE AND MOLYBDATE WITH ALIQUAT 336
Feed: 2.5 g (0.02 moles) $NaVO_3$ and 0.42 g (0.002 moles) $Na_2MoO_4$ in 50 ml. of water

| Aliquat 336 Moles | Total Volume ml. | Raffinate | | |
|---|---|---|---|---|
| | | $NaVO_3$ Moles $\times 10^3$ | $Na_2MoO_4$ Moles $\times 10^3$ | Wt % $Na_2MoO_4$ |
| 0.05 | 200 | 0.08 | 1.60 | 97 |
| 0.05 | 100 | 0.16 | 1.75 | 95 |
| 0.05 | 50 | 2.05 | 1.94 | 62 |
| 0.025 | 200 | 0.16 | 1.84 | 95 |
| 0.025 | 100 | 2.38 | 1.94 | 58 |
| 0.025 | 50 | 8.6 | 1.99 | 28 |

| Aliquat 336 Moles | Extract | | |
|---|---|---|---|
| | $NaVO_3$ Moles $\times 10^3$ | $Na_2MoO_4$ Moles $\times 10^3$ | Wt % $NaVO_3$ |
| 0.05 | 20.4 | .44 | 96 |
| 0.05 | 20.3 | .29 | 98 |
| 0.05 | 18.4 | .10 | 99 |
| 0.025 | 20.3 | .19 | 98 |
| 0.025 | 18.1 | .10 | 99 |
| 0.025 | 11.9 | .05 | 99 |

EXAMPLE IV

A two stage separation was also carried out in order to produce separate purified streams of vanadate and molybdate anions. The feed was 3.45 grams (or 0.028 moles) of $NaVO_3$ and 1.92 grams (0.009 moles) $Na_2MoO_4$ in 50 milliliters of water. In the first stage of the treatment, extraction was performed with 20 grams (0.05 moles) of the trifatty monoalkyl quaternary ammonium surfactant (Aliquat 336) in 100 ml. of xylene solvent. The resulting extract phase contained 3.35 grams $NaVO_3$ and 0.1 gram of $Na_2MoO_4$ in 100 ml. extractant. Approximately 97 percent of the available vanadate anion content was extracted and 97 percent of the metal anions present was vanadate. In the raffinate phase there was 1.82 grams of $Na_2MoO_4$ and 0.1 gram of $NaVO_3$ in 50 milliliters of water; thus, about 95 percent of the metal anions present in the raffinate phase were molybdate, and 95 percent of the available molybdate anion content was removed.

After the second stage of extraction the vanadate rich first stage extract phase yielded a refined second stage extract phase with 3.30 grams of $NaVO_3$ and 0.03 grams of $Na_2MoO_4$ in 100 milliliters of extractant for a percentage yield of 99 percent vanadate compared to molybdate anions. The accompanying second stage raffinate portion of the first stage extract phase contained 0.04 grams of $NaVO_3$ and 0.06 grams $Na_2MoO_4$ in 50 milliliters of water extractant (which was added at the beginning of stage two to this second stage raffinate branch).

Similarly, after the second stage of extraction the molybdate rich first stage raffinate phase yielded a refined second stage raffinate phase containing 0.01 grams $NaVO_3$ and 1.72 grams of $Na_2MoO_4$ in 50 ml. water extract; therefore, greater than 99 percent of the molybdate anions were removed. The accompanying second stage extract portion of this first stage raffinate phase contained 0.09 grams $NaVO_3$ and 0.11 grams $Na_2MoO_4$ in a solvent of 100 milliliters xylene which was added at the start of stage two.

Example IV is merely one possible multi-stage extraction approach, and the scope of the invention is not limited to a one or two stage extraction process. Furthermore, the invention is not restricted to staged extractions with fresh extractant and water added to each stage; therefore, other processes are also included such as continuous countercurrent mixer-settler extraction methods. In countercurrent flow methods are metal is removed from the liquid carrier phase, and the barren liquid is recycled for use in previous stages of the extraction process.

I claim:

1. A process for separation of vanadate and molybdate anions, contained in an aqueous solution, from each other which process comprises:
  (A) containing said solution with an extractant comprising (1) a quaternary ammonium surfactant compound having at least one long chain cationic group having from about 8 to about 24 carbon atoms, and (2) an organic solvent immiscible in water and wherein the volumetric ratio of extractant to aqueous solution is greater than about 2, at a pH of from about 5 to about 9 to effect the selective extraction of vanadate anions by said extractant; and
  (B) partitioning an extractant phase rich in vanadate anions from the aqueous raffinate phase rich in molybdate anions.

2. The process of claim 1 wherein said pH is approximately 7.

3. The process of claim 1 wherein said partitioning step comprises removing an organic phase rich in vanadate anions from an immiscible aqueous phase rich in molybadate anions.

4. The process of claim 1 wherein said quaternary ammonium surfactant comprises at least two long chain aliphatic hydrocarbon groups each having 8 to 24 carbon atoms.

5. The process of claim 4 wherein said quaternary ammonium surfactant further includes an alkyl group having 1 to 4 carbon atoms.

6. The process of claim 1 wherein said quaternary ammonium surfactant comprises a trifatty monoalkyl quaternary ammonium salt.

7. The process of claim 1 wherein said quaternary ammonium surfactant comprises a diffatty dialkyl quaternary ammonium salt.

8. The process of claim 1 wherein the concentrations of said vanadate anions and said quaternary ammonium surfactant are effectively balanced producing separate purified streams of said vanadate and molybdate anions.

9. The process of claim 8 wherein said vanadate moles is greater than 10 percent of said quaternary ammonium surfactant moles.

10. The process of claim 1 further including at least one additional extraction stage which comprises contacting said extract phase with extractant, containing said raffinate phase with aqueous solution, partitioning a refined vanadate anion extract phase, and partitioning a refined molybdate anion raffinate phase.

11. The process of claim 1 wherein said quaternary ammonium surfactant comprises a material selected from the group consisting of the product having at least 50 percent long chain aliphatic hydrocarbons having $C_8$ chains and the remaining long chain aliphatics having $C_{10}$ chains; dialkyldimethylammonium salts; alkylbenzyldimethylammonium chlorides; alkyltrimethylammonium salts; alkylpyridinium halides; bromide or chloride salts of trioctylbutylammonium, trioctylisopropylammonium, tridecylmethylammonium, tridodecylmethylammonium, tetradecylmethylammonium or hexadecyldioctylmethylammonium salts; and mixtures thereof.

12. A process for separation of vanadate and molybdate anions present in an aqueous alkaline solution from each other, said process comprises contacting said aqueous alkaline solution of molybdate and vanadate anions with an extractant comprising a trifatty monoalkyl quaternary ammonium salt dissolved in an organic solvent immiscible with water, at a pH of from about 5 to about 9 and wherein the volumetric ratio of extractant to aqueous solution is greater than about 2 to effect the selective extraction of vanadate anions by said extractant, and partitioning an extractant phase rich in vanadate anions from an aqueous raffinate phase rich in molybdate anions.

13. The process of claim 12 wherein said pH is about 7.

14. The process of claim 12 wherein the concentrations of said vanadate anions and said quaternary ammonium salt are effectively balanced producing separate purified streams of said vanadate and molybdate anions.

15. The process of claim 12 further including at least one additional extraction stage which comprises contacting said extract phase with extractant, contacting said raffinate phase with aqueous solution, partitioning a refined vanadate anion extract phase, and partitioning a refined molybdate anion raffinate phase.

16. The process of claim 12 further including a preliminary step of alkali leaching said vanadate and molybdate anions from a spent petroleum catalyst.

17. The process of claim 16 further including a final step of extracting vanadium and molybdenum from said vanadate extract phase and said molybdate raffinate phase, respectively.

18. The process of claim 12 wherein said quaternary ammonium salt comprises a material selected from the group consisting of the product having at least 50 percent long chain aliphatic hydrocarbons having $C_8$ chains and the remaining long chain aliphatics having $C_{10}$ chains; dialkyldimethylammonium salts; alkylbenzyldimethylammonium chlorides; alkyltrimethylammonium salts; alkylpyridinium halides; bromide ot chloride salts of trioctylbutylammonium, trioctylisopropylammonium, tridecylmethylammonium, tridodecylmethylammonium, tetradecylmethylammonium or hexadecyldioctylmethylammonium salts; and mixtures thereof.

19. A process for solvent extraction of both vanadium and molybdenum from a feed material comprising:
   (a) mixing an aqueous alkaline solution comprising vanadate and molybdate anions with a chemical oxidizer,
   (b) adjusting the pH of said alkaline solution to about 7,
   (c) filtering impurities from said alkaline solution,
   (d) contacting said alkaline solution with an extractant comprising a quaternary ammonium surfactant compound having at least one long chain cationic group having from about 8 to about 24 carbon atoms and an organic solvent immiscible in water,
   (e) partitioning a first stream comprising extractant rich in vanadate from a second stream comprising an aqueous solution rich in molybdate,
   (f) contacting an aqueous solution of sulfate ion with said first stream to produce a purified sodium vanadate aqueous stream,
   (g) adjusting the pH to about 5 for said second stream rich in molybdate,
   (h) contacting the product of step (g) with extractant, and
   (i) contacting an aqueous solution of sulfate ion with product of step (h) to produce a purified molybdate aqueous stream.

20. The process of claim 19 wherein said quaternary ammonium surfactant comprises a material selected from the group consisting of the product having at least 50 percent long chain aliphatic hydrocarbons having $C_8$ chains and the remaining long chain aliphatics having $C_{10}$ chains; dialkyldimethylammonium salts; alkylbenzyldimethylammonium chlorides; alkyltrimethylammonium salts; alkylpyridinium halides; bromide or chloride salts of trioctylbutylammonium, trioctylisopropylammonium, tridecylmethylammonium, tridodecylmethylammonium, tetradecylmethylammonium or hexadecyldioctylmethylammonium salts; and mixtures thereof.

* * * * *

UNITED STATES PATENT OFFICE
CERTIFICATE OF CORRECTION

Patent No. 4,468,373          Dated August 28, 1984

Inventor(s) Nevitt, Thomas D.

It is certified that error appears in the above-identified patent and that said Letters Patent are hereby corrected as shown below:

Patent reads:                    and should read:

| Col. | Line |  |
|------|------|------|
| 1 | 22 "ions" | --anions-- |
| 2 | 14 "products" | --product-- |
| 2 | 56 After "However" | Add --,-- |
| 3 | 18 "subsequent" | --subsequently-- |
| 3 | 57 "are" | --is-- |
| 4 | 53 "gelatenous" | --gelatinous-- |
| 5 | 49 "anion" | --anions-- |
| 5 | 64 "becomes" | --become-- |
| 6 | 34 After "$NaVO_3$" | Add --g.-- |
| 6 | 28 "0.0003" | --0.003-- |
| 6 | 35 "$NaVO_2$ g.--" | --$NaVO_3$ g.-- |
| 6 | 55 "shwon" | --shown-- |
| 8 | 33 "are" | --the-- |
| 9 | 5 "diffaty" | --difatty-- |
| 9 | 13 "is" | --are-- |
| 9 | 17 "containing" | --contacting-- |
| 10 | 15 "ot" | --or-- |

Signed and Sealed this

Ninth Day of July 1985

[SEAL]

Attest:

DONALD J. QUIGG

Attesting Officer    Acting Commissioner of Patents and Trademarks